Jan. 13, 1959  J. A. BAKOS ET AL  2,868,042
METHOD OF MAKING A ONE PIECE SOLID HANDLE KNIFE
Filed June 11, 1956  2 Sheets-Sheet 1

INVENTORS
Joseph Albert Bakos
Robert Elmer McGuire
BY Raymond Joseph Kensel

ATTORNEYS

Jan. 13, 1959     J. A. BAKOS ET AL     2,868,042
METHOD OF MAKING A ONE PIECE SOLID HANDLE KNIFE
Filed June 11, 1956     2 Sheets-Sheet 2

INVENTORS
Joseph Albert Bakos
Robert Elmer McGuire
BY Raymond Joseph Kensel

ATTORNEYS

United States Patent Office 2,868,042
Patented Jan. 13, 1959

2,868,042

METHOD OF MAKING A ONE PIECE SOLID HANDLE KNIFE

Joseph Albert Bakos and Robert Elmer McGuire, Wallingford, and Raymond Joseph Kensel, Middletown, Conn., assignors to R. Wallace & Sons Manufacturing Company, Wallingford, Conn., a corporation of Connecticut Application June 11, 1956, Serial No. 590,543

7 Claims. (Cl. 76—104)

This invention relates generally to the manufacture of knives and, more particularly, to a one-piece solid handle knife and method and apparatus for making the same.

The primary aim and object of the present invention is to simplify the art of making one-piece solid handle knives and to reduce the cost of manufacture of the same. In accordance with this object of the present invention, one-piece solid handle knives, fabricated according to the present invention, are formed by the "cold" working of continuous lengths of knife-forming stock whereby finished knives may be readily mass produced efficiently and at low cost.

Another object of the present invention is the provision of improvements in method and apparatus for the manufacture of knives of the above character in which said knives may be mass produced utilizing a minimum of skilled labor and special apparatus, the latter being relatively simple and inexpensive to manufacture.

Another object of the present invention is the provision of continuous lengths of stock of novel cross-section which are adapted for forming knives, having approximately their final size and shape, in the apparatus of the present invention.

Another object of the present invention is the provision of a generally improved one-piece solid handle knife which is formed at least in part by a rolling operation.

Another object of the present invention is the provision of rolling apparatus in which the rollers thereof have peripheral surface provisions providing for the positive feeding of lengths of stock through the rollers.

Yet another object of the present invention is the provision of a generally improved method and apparatus for the manufacture of knives of the above character.

The above and other objects, features and advantages of the present invention will be more fully understood from the following description considered in connection with the accompanying illustrative drawings.

In the drawings which illustrate the best mode now contemplated by us for carrying out our invention:

Figure 2:
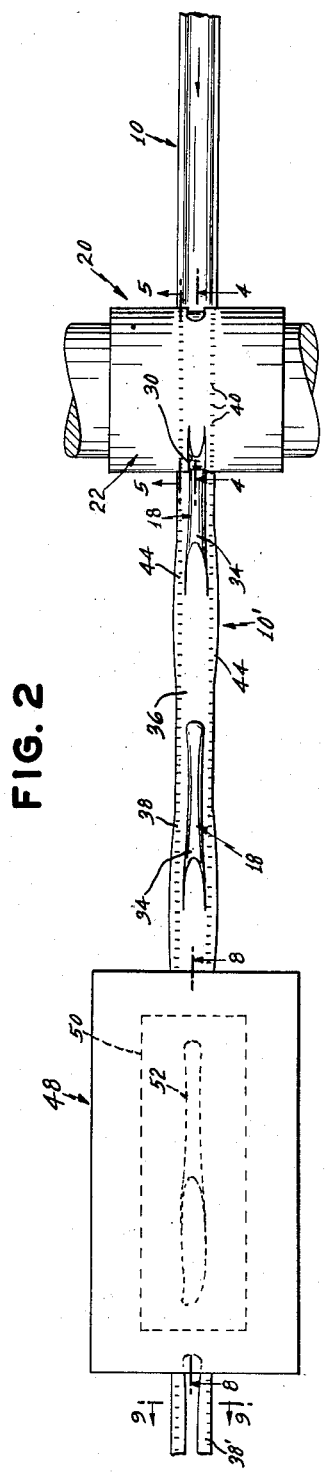
Fig. 2 is a top plan view showing a continuous length of knife-forming stock being processed by the apparatus of the present invention.
Figure 3:
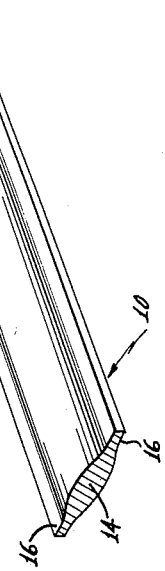
Fig. 3 is a fragmentary perspective view showing a length of knife-forming stock in accordance with the present invention.
Figure 1:
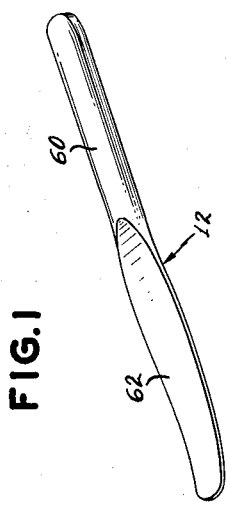
Fig. 1 is a perspective view of a finished knife formed according to the present invention.
Figure 4:
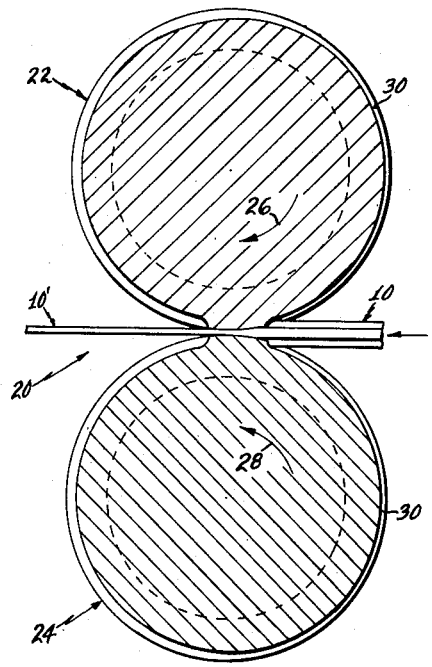
Fig. 4 is a sectional view, on an enlarged scale, taken on line 4—4 of Fig. 2.

Referring to the drawings in detail, there is shown in Fig. 3 a length of knife-forming stock 10 of novel cross-sectional outline which is adapted to be processed into finished knives 12, one of which is shown in Fig. 1, by the method and apparatus to be described in detail hereinafter. The knife-forming stock 10 may be formed of any of the usual knife materials, for example and without limitation carbon steel, stainless steel and the like. The stock 10 is of uniform cross-section throughout its length which is a generally oval cross-section as indicated at 14 having diametrically opposite flanges 16 at the major axis thereof, said cross-section being of a size to provide the requisite amount of material necessary for forming the knife blanks 18. In order to fabricate stock 10 to form the rolled stock 10' having a series of longitudinally spaced longitudinal members or knife blanks 18, there is provided rolling apparatus 20 which will now be described.

The rolling apparatus 20 comprises a structurally similar pair of rollers 22 and 24 which are adapted for rotation in the direction of arrows 26 and 28, respectively by any suitable means (not shown) at the same speed. Each roller 22, 24 is provided with a peripherally extending groove 30 and said grooves coact to collectively define between the rollers a cavity 32 which approximates the final size and shape of a finished knife 12. Thus the peripheral grooves 30 of the rollers are disposed for registry to define the cavity 32 and a length of stock 10 is continuously fed between the pair of rollers in a "cold" state to form the rolled stock 10' comprising a series of knife blanks 18, the latter being formed in the cavity 32 and being complementary thereto. The longitudinal members or knife blanks 18 have a handle part 34 and a blade part 36 which are approximately of the final size and shape they are to have in the finished knife and the material 38 of the rolled stock, which extends beyond the outline of the knife blanks, is adapted to be removed from the latter and constitutes waste or trimming material. The blade part 36 is rolled first followed by the rolling of the handle part 34. While the rolling apparatus of the illustrated embodiment is adapted to form one knife blank per revolution or cycle of operation, it will be apparent that if desired rolling apparatus may be utilized in which each roller is provided with a plurality of peripheral grooves 30 arranged laterally or longitudinally of each other in order to roll a plurality of knife blanks with each revolution of the rolling apparatus.

Figure 5:
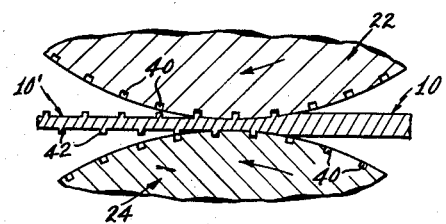
Fig. 5 is a fragmentary sectional view, on an enlarged scale, taken on line 5—5 of Fig. 2.
Figure 6:
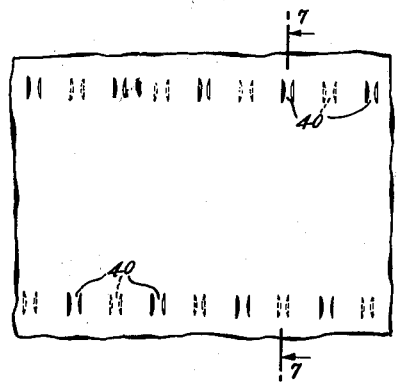
Fig. 6 is a fragmentary top plan view of the rollers showing the peripheral surface provisions which provide for the positive feeding of lengths of stock through the rollers.
Figure 8:
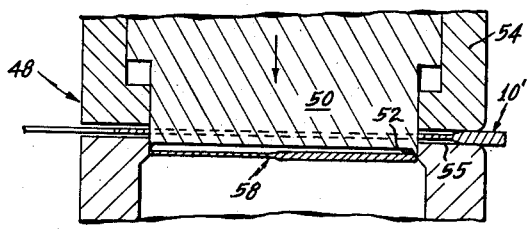
Fig. 8 is a sectional view taken on line 8—8 of Fig. 2.
Figure 7:
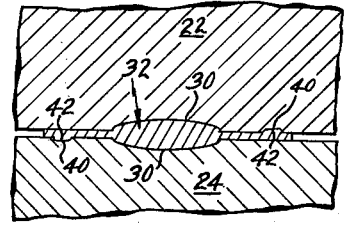
Fig. 7 is a sectional view taken on line 7—7 of Fig. 6.
Figure 9:
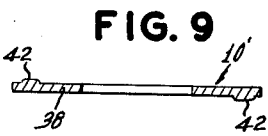
Fig. 9 is a sectional view, on an enlarged scale, taken on the line 9—9 of Fig. 2.

In the rolling operation, oil or some other suitable lubricant is used in order to prevent the stock from sticking to the rollers and in order to prevent slippage of the lubricated stock relative to the rollers there is provided a series of spaced indentations 40 disposed at opposite sides of each of the grooves 30 laterally adjacent to the latter and extending peripherally of said rollers, said indentations forming corresponding series of complementary projections 42 at the marginal edge portions 44 of the rolled stock 10'. The indentations 40 extend into the peripheral surface of the rollers and are substantially uniformly spaced laterally of their companion grooves 30. The series of indentations 40 at one side of each of the grooves 30 is staggered with respect to the series of indentations at the opposite side of the grooves in order to distribute said indentations to enhance the positive feeding of the stock between the rollers. The indentations 40 of the upper and lower rollers are also staggered with respect to each other, as clearly shown in Figs. 5 and 6, for further distributing said indentations and to insure the positive feeding of the stock through the rollers. Thus the projections 42 along the opposite faces of the rolled stock 10' are staggered and similarly the projections at opposite sides of each face of the rolled stock are similarly staggered. It will be observed that the projections 42 are disposed externally of the outline of the blanks 18 along the material 38 which forms the excess or waste material of the rolled stock 10'. The opposite marginal edge portions 44 of the rolled blank 10' are formed essentially from the diametrically opposite flanges 16 of the stock 10.

The knife blanks 18 may be cut to outline and severed from the stock 10' in any suitable manner utilizing any suitable apparatus. The blade blanks 18 are individually severed from the stock 10' and simultaneously cut to outline by the cutting die apparatus 48, the latter having a vertically reciprocable die 50 with an active die face or cutting edge 52 of an outline approximating the outline of the finished knife 12. The die 50 is vertically reciprocated in any suitable manner relative to its companion stationary frame 54, the latter having a guideway 55 for the passage therethrough of the rolled stock. In operation, the rolled stock 10' is fed into the apparatus 48 so as to register each blank 18 with the die face 52, the latter being suitably actuated for cutting the blank 18 to outline and severing the same from the rolled stock. The remaining material 38' of the rolled stock beyond the outline of the cut knife blanks 58 constitutes scrap or waste and it will be apparent that the complementary projections 42 are on said scrap or waste. The cut-to-outline knife blanks 58 are thereafter subjected to the usual series of finishing and polishing operations, as will be apparent to those skilled in the art, whereby to form said blanks into finished knives 12. It will be understood that the knife finishing operations to convert the blank 58 to a finished knife 12 are conventional in all respects and that any desired finishing operations may be performed on said blank to form a finished knife. The blade part 36 of the knife blank 18 may be longitudinally or laterally tapered as desired, and it will be understood that the cavity 32, defined between the rollers, will be correspondingly tapered in order to form such a tapered knife blade part.

From the above it will be apparent that the one-piece solid handle knife 12 comprises integrally formed longitudinal handle and blade parts 60 and 62, respectively, said parts having their cross-sectional outline formed by a rolling operation in apparatus 20 from the stock 10. Since the afore referred to rolling operation if performed with the stock in a "cold" state, no scale will be formed on the surfaces of rolled stock 10' in the rolling operation and accordingly the surfaces of the knife blanks 18 will be relatively smooth and free of surface defects and imperfections. Any desired length of stock 10 may be continuously rolled in the apparatus 20 whereby knives formed pursuant to the present invention may be mass produced efficiently and at low cost.

While we have shown and described the preferred embodiments of our invention, it will be understood that various changes may be made in the idea or principles of the invention within the scope of the appended claims.

Having thus described our invention, what we claim and desire to secure by Letters Patent, is:

1. A method of making a one-piece solid handle knife, comprising providing a metal blank of predetermined cross section, rolling said metal blank between a pair of complementary rollers to form a rolled blank comprising a longitudinal member having a handle part and a blade part approximating the final size and shape they are to have in the finished knife, simultaneously forming projections on said blank which interengage with complementary indentations on said rollers for positive driving of said stock relative to said rollers, and thereafter cutting said longitudinal member to outline and simultaneously severing the same from said rolled blank.

2. A method of making a one-piece solid handle knife, comprising providing a metal blank of predetermined cross section, rolling said blank in a cold state between a pair of complementary rollers defining a cavity approximating the final size and shape of the finished knife therebetween to form a rolled blank comprising a longitudinal member approximating said final size and shape, simultaneously forming projections on said stock which interengage with complementary indentations on said rollers for positive driving of said stock relative to said rollers, and thereafter cutting said longitudinal member to outline and severing the same from said rolled blank, said predetermined cross section being a generally oval cross section having diametrically opposite flanges at the major axis thereof.

3. A method of making one-piece solid handled knives, comprising providing metal stock of predetermined cross section and indeterminate length, cold shaping said metal stock between a pair of complementary rollers to form shaped stock comprising a series of longitudinally spaced longitudinal members with each of the latter having a handle part and a blade part approximating the final size and shape they are to have in the finished knife, said blade part being formed first and followed by the forming of said handle part during said cold shaping operation whereby the excess material of the blade part is coined into said handle part, simultaneously forming projections on said stock which interengage with complementary indentations on said rollers for positive driving of said stock relative to said rollers, and thereafter cutting each of said longitudinal members to outline and severing the same from said shaped stock.

4. A method of making one-piece solid handled knives, comprising providing metal stock of predetermined cross section and indeterminate length, feeding said stock in a cold state between a pair of complementary rollers defining a cavity approximating the final size and shape of the finished knife therebetween to form rolled stock comprising a series of longitudinally spaced longitudinal members approximating said final size and shape, simultaneously forming projections on said stock which interengage with complementary indentations on said rollers for positive driving of said stock relative to said rollers, and thereafter cutting each of said longitudinal members to outline and severing the same from said shaped stock, said predetermined cross section being a generally oval cross section having diametrically opposite flanges at the major axis thereof.

5. A method of making a one piece solid handle knife, comprising providing a metal blank of predetermined cross section, cold rolling said metal blank between a pair of complementary rollers to form a rolled blank comprising a longitudinal member having a handle part and a blade part approximating the final size and shape they are to have in the finished knife, said blade part being formed first and followed by the forming of said handle part during said cold rolling operation whereby the excess material of the blade part flows longitudinally and is forced into said handle part, and thereafter cutting said longitudinal member to outline and severing the same from said rolled blank.

6. A method of making a one piece solid handle knife, comprising providing a metal blank of predetermined cross section, cold rolling said metal blank between a pair of complementary rollers to form a rolled blank comprising a longitudinal member having a handle part and a blade part approximating the final size and shape they are to have in the finished knife, said blade part being formed first and followed by the forming of said handle part during said cold rolling operation whereby the excess material of the blade part flows longitudinally and is forced into said handle part, and thereafter cutting said longitudinal member to outline and severing the same from said rolled blank, said predetermined cross section being a generally oval cross section having diametrically opposite flanges.

7. A method of making a one-piece solid handle knife, comprising providing a metal blank of predetermined cross section, cold rolling said metal blank between a pair of complementary rollers to form a rolled blank comprising a longitudinal member having a first formed blade part and a subsequently formed handle part whereby the excess material of the blade part flows longitudinally and is forced into said subsequently formed handle part, said handle part being of greater cross section than said blade part, and thereafter cutting said longitudinal member to outline and severing the same from said rolled blank.

References Cited in the file of this patent

UNITED STATES PATENTS

| | | |
|---|---|---|
| 57,004 | Smith | Aug. 7, 1866 |
| 63,795 | Hubbard | Apr. 16, 1867 |
| 173,237 | Pedder et al. | Feb. 8, 1876 |
| 206,919 | Baker | Aug. 13, 1878 |
| 324,867 | Meatyard | Aug. 25, 1885 |
| 346,138 | Whitty | July 27, 1886 |
| 813,009 | Kny | Feb. 20, 1906 |
| 965,981 | Bach | Aug. 2, 1910 |
| 1,572,343 | Witherow | Feb. 9, 1926 |
| 1,578,791 | Wood | Mar. 30, 1926 |
| 1,618,791 | Witherow | Feb. 22, 1927 |
| 2,621,345 | Howell | Dec. 16, 1952 |
| 2,639,660 | Sunderhauf et al. | May 26, 1953 |